May 2, 1933. L. C. STUKENBORG 1,906,497
WHEEL GUIDE FOR AUTOMOBILE LIFTS
Filed March 26, 1931   2 Sheets-Sheet 1
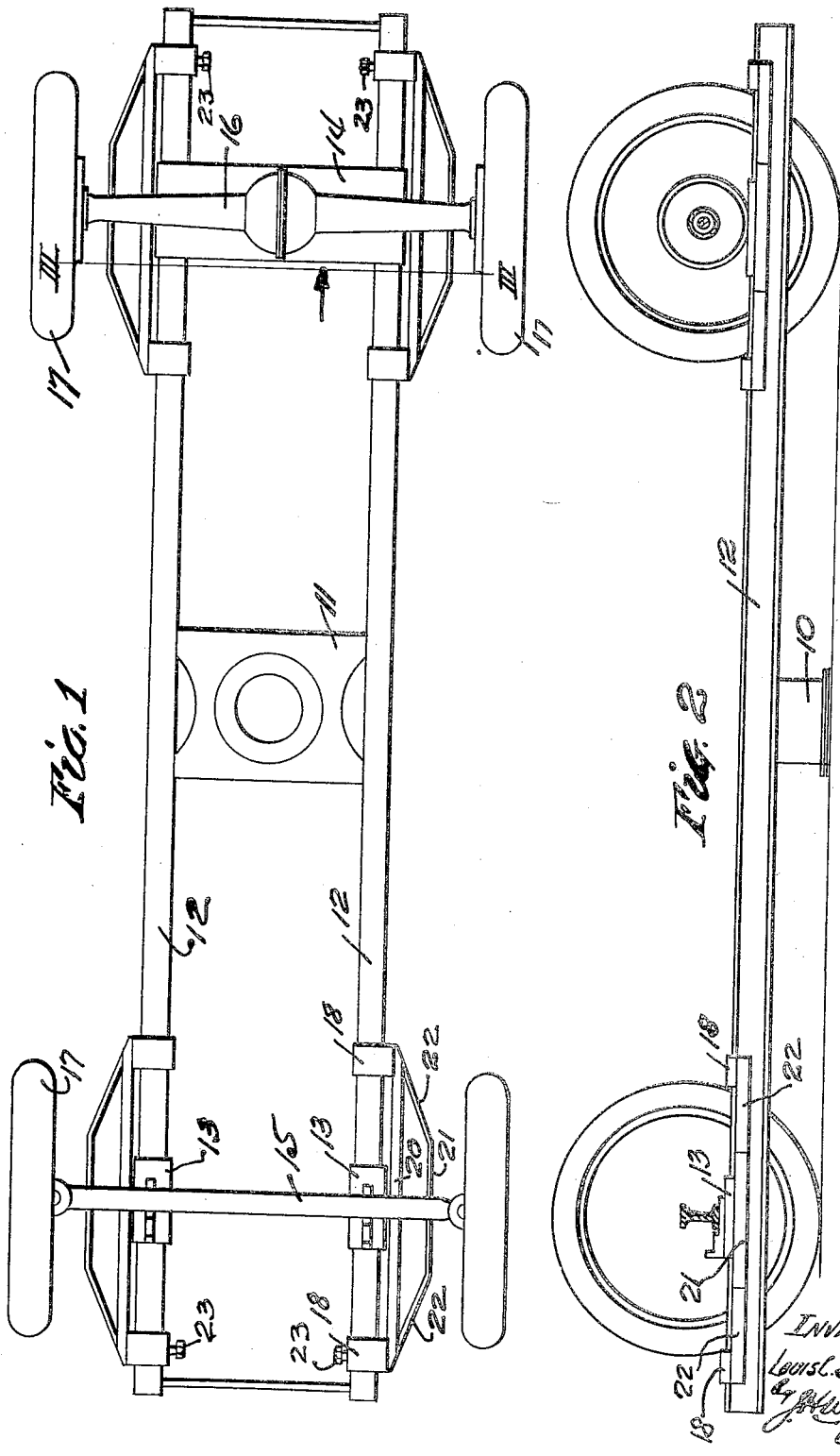

May 2, 1933.  L. C. STUKENBORG  1,906,497
WHEEL GUIDE FOR AUTOMOBILE LIFTS
Filed March 26, 1931   2 Sheets-Sheet 2
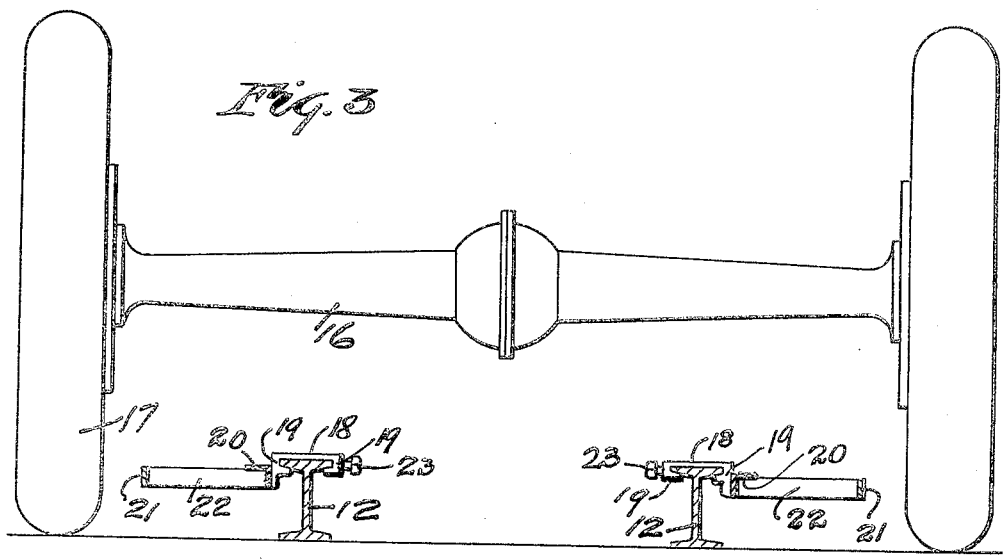
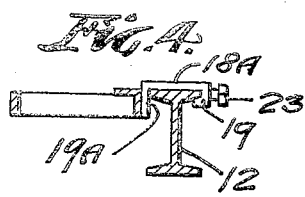 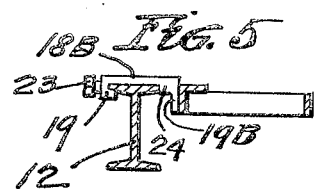
INVENTOR
LOUIS C. STUKENBORG.
by J.H. Weatherford
ATTY.

Patented May 2, 1933

1,906,497

UNITED STATES PATENT OFFICE

LOUIS C. STUKENBORG, OF MEMPHIS, TENNESSEE

WHEEL GUIDE FOR AUTOMOBILE LIFTS

Application filed March 26, 1931. Serial No. 525,394.

This invention relates to vehicle lifts of that type which employ a centrally disposed jack which carries a cradle adapted to engage the axles of an automobile whereby the automobile may be raised with the wheels free. It has especial relation to means for guiding the automobile as it is being driven into place over the cradle whereby the automobile may be properly positioned with relation to the cradle.

In those forms of vehicle lift which employ rails on which the wheels are disposed, channel irons are ordinarily used for the rails, and these channel irons automatically form guides which direct or guide the wheels. In the wheel-free type however, positioning must ordinarily be done more or less blindly. When an automobile is approaching this latter type of device, the driver can see the cradle as he approaches it, but by the time the front wheels reach the nearest edge of the cradle the view of the balance of the cradle is cut off by the radiator and other parts of the machine and thereafter positioning must be done blindly. In many cases the front end of the automobile is positioned so far to one side as to endanger the balancing of the automobile and numerous accidents have thereby been caused. It will be appreciated also, that in this type of lift in which the cradle rotates freely about the jack as a vertical axis, automobiles approach the lift from various directions so that fixed grooves or track-ways are not ordinarily feasible.

The objects of my invention are:

(a) To provide guiding means which indicate to the chauffeur of an automobile the proper positioning of the wheels with reference to the table as the auto approaches the table, and which shift the table into alignment between the wheels if the vehicle is driven over the table too far toward either side;

(b) To provide guiding means which may be shifted along the table to position them so that they will not interfere with access to the sides of the table when the vehicle is in raised position.

The means by which the foregoing and other objects are accomplished and the manner of their accomplishment will readily be understood from the following specification on reference to the accompanying drawings, in which:—

Fig. 1 is a plan view of the table or cradle of an automobile lift which has rails for engaging the vehicle axle between the wheels, which table is equipped with guides, and showing the front and rear axles and wheels of an auto positioned thereover;

Fig. 2 is a side elevation showing the table raised slightly from the ground surface;

Fig. 3 is a sectional elevation on a larger scale taken as on the line III—III of Fig. 1;

Fig. 4 and Fig. 5 are sectional elevations taken on the same line as Fig. 3, showing modified forms of the rail shoe.

Referring now to the drawings in which the various parts are indicated by numerals, 10 is the plunger of a hydraulic jack having secured thereto a head 11 which carries a cradle made up of two parallel rails or beams 12, secured to the head at equal distances from the axis of the plunger, and which rails are adapted either directly or through shoes 13 and a cradle 14 to engage with the front and rear axles 15, 16 respectively of an automobile, whereby the automobile may be raised with the wheels 17 free for rotation. As is usual in such cases the overall width of the cradle is very considerably less than the transverse spacing of the wheels of the auto, and it is of extreme importance that the longitudinal axis of the auto be centered over the corresponding axis of the table to avoid danger of overturning.

Slidably mounted on the rails 12 are shoes 18 each of which (as will be seen by reference to Fig. 3,) has side portions 19 extended downward on opposite sides of the upper flange of the rail 12 and thence turned inward toward the web of the rail to engage the undersides of the flange. These shoes are made loosely fitting so that they may be slipped on at the ends of the rails and slid therealong. Two of the shoes are spaced apart and are secured together by welding to them an angle iron 20, the outer end faces of the shoes preferably being flush with the ends of the angle iron. Preferably the top of the angle iron is so disposed with relation to the top of the shoes that the angle iron is entirely below the top of the rail, whereby the axle resting on the rail will not bear on or bind the angle iron and therefore will not prevent shifting of the guide unit. Secured to the underside of the angle iron, is a guiding member which is preferably a flat strap of iron with its flat sides vertically disposed. The center portion 21 of this guiding member is disposed parallel with the angle iron 20 with its ends 22 diverging inward toward the ends of the angle iron to which they are firmly secured as by welding. Each guiding unit thus comprises a pair of shoes, a connecting angle iron, and a guiding member secured to and extending laterally outward from the angle iron and, each such unit is movable along the rails of the cradle independently of the other units.

The complete device comprises four guides, one of which is placed on each cradle rail adjacent the end of the cradle, with the guide extending laterally outward from the rail.

In using the device, the cradle is lowered in usual manner until it rests on the floor or ground surface to receive the auto, at which time the guides are supported somewhat above the ground level. The auto to be raised is driven toward the cradle and if properly aligned the wheels will pass both sets of guides without disturbing the positioning of the table thus definitely indicating that the car is properly centered for raising. If however through carelessness or otherwise, the car is not properly centered, the front wheels will strike the guides and swing the opposite end of the table definitely out of line so that it will be necessary to change the direction of further approach of the car to center it over the opposite end of the table. If in doing this the rear wheels strike either of the guides and again swing the table it would only be necessary to back up slightly and thereafter approach in proper direction. In any event proper alignment is so clearly indicated that only willful mishandling can prevent proper centering and even this can only be of minor extent.

Thereafter the car being properly centered the lift may be operated in usual manner and the car raised. While the car is being raised should for any reason there be an excess of weight on one side of the car such as might be brought about by some one stepping out on one of the running boards, the guides on such weighted side would serve as additional security against overturning.

When the car is raised the axles are supported from the cradle rails and are independent of the guiding units, it is therefore possible to shift the guides backward or forward along the cradle rails so as to provide more convenient access to the rail and other points.

If desired one, or both, of the shoes of each guiding unit may be provided with means for clamping it against shifting, as for instance the set screws 23.

In Figs. 4 and 5, I show modified forms 18A, 18B, of the shoes. The shoe 18A has one side portion 19 extending downward and inward as before and an opposite side portion 19A extending straight downward, whereby the unit may be tilted upward and the shoes engaged with the rail and then swung downward to working position and securely held. The shoe 18B is similar except that an intermediate shouldered portion 24 is interposed between the side portion 19B and the rail flange so that only the shoes may be slid in laterally until the portions 19 drop downward into engagement with the rail flange and thereafter be reversely shifted into engagement and be so held by engagement of the shoulder 24 with the rail flange.

Having described my invention, what I claim is:—

1. In a wheel free lift for automobiles, lifting means, axle engaging rails carried thereby and adapted to engage the axles of an automobile between and away from the wheels thereof, and wheel guides in pairs, each guide comprising a pair of shoes spaced apart and slidable along one of said rails, means securing said shoes together in spaced position and a guiding member comprising an elongated bar spaced from and substantially parallel with said rails, the ends of said bar, each deflecting at an acute angle inward from said central portion toward said rail and being secured at its inward end to a shoe.

2. In a wheel free lift for automobiles, lifting means, axle engaging rails carried thereby and adapted to engage the axles of an automobile between and away from the wheels thereof, and wheel guides, in pairs, each guide comprising a pair of shoes spaced apart and slidable along one of said rails, and a guiding member comprising an elongated bar spaced laterally outward from and substantially parallel with a rail, the ends of said bar, each deflecting at an acute angle inward from said central portion toward and being secured at its inward end to a shoe.

3. In a wheel free lift for automobiles, lifting means, axle engaging rails carried thereby and adapted to engage the axles of an automobile between and away from the wheels thereof, and wheel guides in pairs, each guide comprising a pair of shoes spaced apart and slidable along one of said rails, a rigid member securing said shoes together in spaced position and a guiding member comprising an elongated bar spaced laterally outward from and substantially parallel with a rail, the ends of said bar deflecting at an acute angle inward from said central portion and being each secured at its inward end to a shoe.

4. In a wheel free lift for automobiles, lifting means, axle engaging rails carried thereby and adapted to engage the axles of an automobile between and away from the wheels thereof, and wheel guides, in pairs, each comprising an elongated bar spaced laterally outward from and substantially parallel with a rail, the ends of said bar deflecting at an acute angle inward toward, and each being slidably secured to, said rail, the top of said bar lying below the upper surface of said rail.

5. In a wheel free lift for automobiles, lifting means, axle engaging rails carried thereby and adapted to engage the axles of an automobile between and away from the wheels thereof, and wheel guides, in pairs, each comprising an elongated bar disposed below the level of, spaced laterally outward from and substantially parallel with a rail, the ends of said bar each deflecting at an acute angle inward toward said rail, and means for slidably supporting said bar ends from said rail.

6. In a wheel free lift for automobiles, lifting means, supporting rails carried thereby, adapted to lie between and away from the auto wheels, and a guiding unit, comprising a pair of spaced shoes each having rail engaging parts, and a guiding member comprising a central portion spaced laterally outward and substantially parallel with the alignment of said shoes, and integral end portions each deflecting at an acute angle inward toward said rail and secured to a shoe, said shoes rigidly supporting said member.

7. In a wheel free lift for automobiles, lifting means, supporting rails carried thereby, adapted to lie between and away from the auto wheels, and a guiding unit, comprising a pair of spaced shoes, and a guiding member comprising a central portion spaced laterally outward from and substantially parallel with the alignment of said shoes, and integral end portions each deflecting at an acute angle inward toward said rail and secured to a shoe.

8. In a wheel free lift for automobiles, lifting means, supporting rails carried thereby, adapted to be between and away from the auto wheels, and a guiding unit, comprising a pair of spaced shoes, and a guiding member comprising a central portion spaced laterally outward and substantially parallel with the alignment of said shoes and having integral end portions each deflecting at an acute angle inward toward said rails, and secured to a shoe, said shoes each having a rail-flange claw engaging the inner top flange of the rail and a straight sided member contacting the edge of the opposite top flange of said rail, whereby said shoes and the guide member secured thereto are rigidly supported by said rail.

9. In a wheel free lift for automobiles, lifting means, axle engaging rails carried thereby and adapted to engage the axles of an automobile between and away from the wheels thereof, and wheel guides, in pairs, each comprising an elongated bar spaced laterally outward from and substantially parallel with a rail, the ends of said bar deflecting at an acute angle inward toward, and each being slidably secured to, said rail.

10. In a wheel free lift for automobiles, lifting means, axle engaging rails carried thereby and adapted to engage the axles of an automobile between and away from the wheels thereof, and wheel guides, in pairs, each comprising an elongated bar spaced laterally outward from and substantially parallel with a rail, the ends of said bar each deflecting at an acute angle inward toward said rail, and means for slidably supporting said bar ends from said rail.

In testimony whereof I hereunto affix my signature.

LOUIS C. STUKENBORG.